(12) United States Patent
Chew

(10) Patent No.: US 12,216,609 B2
(45) Date of Patent: Feb. 4, 2025

(54) 2-WIRE INTERFACE AND RESET METHOD THEREOF

(71) Applicant: PIXART IMAGING INC., Hsin-Chu County (TW)

(72) Inventor: Yen-Hsiang Chew, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 84 days.

(21) Appl. No.: 17/979,762

(22) Filed: Nov. 3, 2022

(65) Prior Publication Data

US 2024/0152482 A1 May 9, 2024

(51) Int. Cl.
*G06F 13/42* (2006.01)

(52) U.S. Cl.
CPC ...... *G06F 13/4291* (2013.01); *G06F 13/4221* (2013.01)

(58) Field of Classification Search
CPC .................. G06F 3/4221; G06F 13/4291
See application file for complete search history.

(56) References Cited

U.S. PATENT DOCUMENTS

| | | | | |
|---|---|---|---|---|
| 9,665,528 | B2* | 5/2017 | Freudenberger | G06F 13/404 |
| 2004/0095952 | A1* | 5/2004 | Zhang | H04L 12/40 |
| | | | | 370/438 |
| 2010/0235017 | A1* | 9/2010 | Peltonen | B61L 15/0081 |
| | | | | 701/2 |
| 2012/0062283 | A1* | 3/2012 | Kwan | G01R 31/318575 |
| | | | | 327/143 |
| 2016/0147708 | A1* | 5/2016 | Freudenberger | G06F 13/4291 |
| | | | | 710/110 |
| 2021/0018969 | A1* | 1/2021 | Srivastava | G06F 1/06 |
| 2023/0083877 | A1* | 3/2023 | Mishra | G06F 13/4282 |
| | | | | 710/110 |
| 2023/0299438 | A1* | 9/2023 | Mocanu | G01R 31/396 |

* cited by examiner

*Primary Examiner* — Phong H Dang
(74) *Attorney, Agent, or Firm* — HAUPTMAN HAM, LLP

(57) ABSTRACT

There is provided an operation of a 2-wire interface including: performing, by a master device, at least one transaction with a slave device to compare a calculated expected value and a return value of a register to confirm whether an out-of-sync occurs, and resetting a state machine of the slave device to a reset_done state and receiving, by the maser device, an acknowledge byte from the slave device to recover a synchronization between the master device and the slave device when the out-of-sync occurs.

15 Claims, 5 Drawing Sheets

2-WIRE INTERFACE AND RESET METHOD THEREOF

BACKGROUND

1. Field of the Disclosure

This disclosure generally relates to a 2-wire interface and, more particularly, to operating methods of detecting a sync condition between a master device and a slave device and resetting a state machine of the slave device, as well as a 2-wire interface using the same.

2. Description of the Related Art

The 2-wire serial peripheral interface (SPI) uses a clock pin (SCLK) and a bi-directional I/O pin (SDO) to implement the SPI protocol. Compared with the conventional 4-wire SPI and 3-wire SPI, because physical traces in the 2-wire SPI connecting a master device and a slave device is reduced, the system cost can be reduced. Furthermore, since the NCS pin and the MISO pin are not used in the 2-wire SPI, they can be used for other functions.

However, when a state machine of the slave device is not synchronized to the master device, because no NCS signal can be used to reset the state machine of the slave device, it is possibly required to use the hard reset to recover the synchronization.

One reason causing the out-of-sync between the master device and the slave device is the SCLK clock glitch(s). Therefore, based on its property, one conventional method to recover the synchronization is for a master device to repeatedly "glitch" the SCLK till the master device and the slave device synchronize to each other again. The process of "glitching" SCLK may include the steps of: toggling the SCLK (for one single clock cycle; performing a read transaction to a slave device register with a fixed return value (e.g., a product ID register that will always return a fixed data pattern while being read); comparing the read back register data with an expected value; and determining that the master device and the slave device is back to a synchronized state if the read back register data matches the expected value. However, if the read back register data does not match the expected value, then the SCLK. "glitching" process may be iteratively repeated until the read back register data matches the expected value. A drawback of this method is that it may require multiple iterations (up to 15 iterations maximum for a SPI device state machine that implements read/write transactions having a 8-bit address frame followed by a single 8-bit data frame) of "glitching" the SCLK in order to bring the master device and slave device back to a synchronized state. During the iterative SCLK "glitching" process, a configuration register or a control register of the slave device may be inadvertently written to, which may cause the slave device to have unexpected behavior. Furthermore, the bi-directional SDO must be configured as "open drain" to prevent both the master device and the slave from actively driving the SDO at the same time during the iterative SCLK "glitching" process. However, the "open drain" of the SDO can limit an operating speed of the 2-wire SM.

Another synchronizing method is to arrange a watchdog timer for resetting the state machine of the slave device. One drawback of this method is that the watchdog timer is continuously running as long as the slave device's SPI interface remains functional even when the slave device is in a low power mode, a rest mode or a shutdown mode such that the power consumption is increased.

Accordingly, the present disclosure provides a method of identifying whether a slave device and a master device of a 2-wire interface are synchronized to each other and a method of recovering synchronization, as well as a 2-wire interface using these methods.

SUMMARY

The present disclosure provides a sync detection method that performs at least one read/write transaction between a master device and a slave device, and compares an expected value of the at least one transaction with a return value of a register in the slave device to confirm a synchronizing status.

The present disclosure further provides a sync recovering method that resets a state machine of a slave device to a reset_done state when a master device identifies an out-of-sync and then transfers an acknowledge byte from the slave device to the master device to accomplish the synchronization between the master device and the slave device.

The present disclosure provides a sync detection method of a 2-wire interface. The 2-wire interface includes a master device and a slave device. The sync detection method includes the steps of: performing at least one transaction between the master device and the slave device, and calculating an expected value of the at least one transaction; reading, by the master device, a content value of a register in the slave device after the at least one transaction; and comparing, by the master device, the expected value and the content value to confirm a synchronization between the mater device and the slave device.

The present disclosure further provides a reset method of a 2-wire interface. The 2-wire interface includes a master device and a slave device coupled to each other via a clock line and a serial data out (SDO) line. The reset method includes the steps of: changing an SDO port of the master device from output to input when the master device identifies an out-of-sync occurring at a first time, and resetting an SDO counter of the master device; changing an SDO port of the slave device to input when the slave device accomplishes a current transaction at a second time to pull up a voltage on the SDO line to logic high; invoking reset of the slave device after toggling 16 clocks behind the second time and transferring an acknowledge byte to the master device in a reset_done state of the slave device; and identifying, by the master device, whether the acknowledge byte is correct, wherein the master device continuously toggles clocks to the slave device after the first time till the acknowledge byte is over.

The present disclosure further provides a 2-wire interface including a master device and a slave device. The master device has an SDO counter is used to count clocks of a clock signal. The slave device performs transactions with the master device via a clock line, which is used to transfer the clock signal, and an SDO line. The master device is configured to identify an out-of-sync with the slave device, and change an SDO port thereof from output to input when identifying the out-of-sync and toggle the clocks to the slave device respectively within a first interval, a second interval and a third interval till receiving an acknowledge byte. The slave device is configured to change an SDO port thereof to input when a current transaction is accomplished to pull up a voltage on the SDO line to logic high till reset is over, and send the acknowledge byte within the third interval.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, Wherever possible, the same reference numbers will be used throughout the drawings to refer to the same or like parts.

One objective of the present disclosure is to provide methods of detecting an out-of-sync and resetting synchronization of a 2-wire interface. The 2-wire interface of the present disclosure does not require an additional watchdog timer so as not to increase the power consumption and does not require multiple times of data transactions to accomplish synchronization between a master device and a slave device such that an operating speed is not limited.

Figure 1:
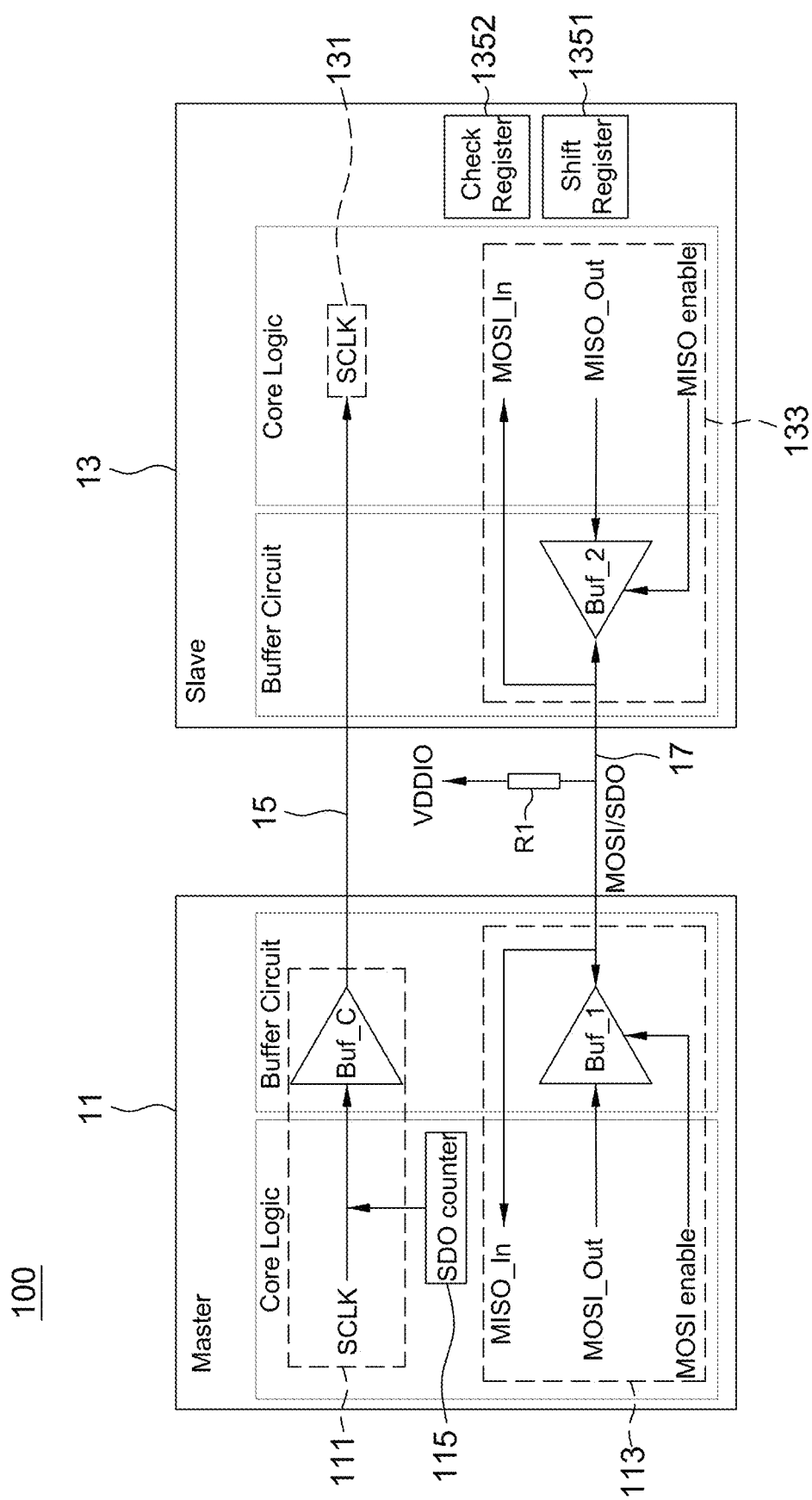
FIG. 1 is a schematic block diagram of a 2-wire interface according to one embodiment of the present disclosure.

Please refer to FIG. 1, it is a schematic block diagram of a 2-wire interface 100 according to one embodiment of the present disclosure. The 2-wire interface 100 includes a master device 11 and a slave device 13, which are coupled to each other via a clock line 15 and a serial data output line 17 (also shown as MOSI/SDO, sometimes abbreviated as SDO line herein) to perform data transactions. The 2-wire interface 100 is, for example, a 2-wire serial peripheral interface (2-wire SPI), but not limited to the SPI.

The slave device 13 may be a human input device (HID) such as an optical navigation sensor device, a mouse device, a keyboard device or a joystick device; or any other types of devices that may implement a SPI interface: without particular limitations. The master device 11 is a computing device coupled with the slave device 13, e.g., including a processor, a micro-controller, a desktop computer, a notebook computer, a workstation or other computing device that implements a SPI interface without particular limitations.

FIG. 1 shows the core logic and buffer circuit of the master device 11, and the buffer circuit is used to buffer signals from the core logic. The master device 11 includes a clock port 111 and an SDO port 113.

The clock port 111 outputs a clock signal SCLK, to the clock line 15.

The SDO port 113 outputs address bytes, and outputs/inputs data bytes via the SDO line 17 corresponding to a write operation or a read operation. For example, when the MOSI enables (e.g., using an enable signal) an I/O buffer Buf_1, the SDO port 113 is operating in master_out_slave_in (i.e., shown as MOSI_Out); whereas, when the MOSI disables the I/O buffer Buf_1, the SDO port 113 is operating in master_in_slave_out (i.e., shown as MISO_In), or vice versa.

FIG. 1 further shows the core logic and buffer circuit of the slave device 13. The slave device 13 includes a clock port 131 and an SDO port 133.

The clock port 131 is used to receive the clock signal SCLK from the master device 11 via the clock line 15.

The SDO port 133 receives the address byte, and inputs/outputs data byte via the SDO line 17 corresponding to the read operation or the write operation. For example, when the MISO enables (e.g., using an enable signal) an I/O buffer Buf_2, the SDO port 133 is operating in master_in_slave_out (i.e., shown as MISO_Out); whereas, when the MISO disables the I/O buffer Buf_2, the SDO port 133 is operating in master_out_slave_in (i.e., shown as MOSI_In), or vice versa.

Figure 2:
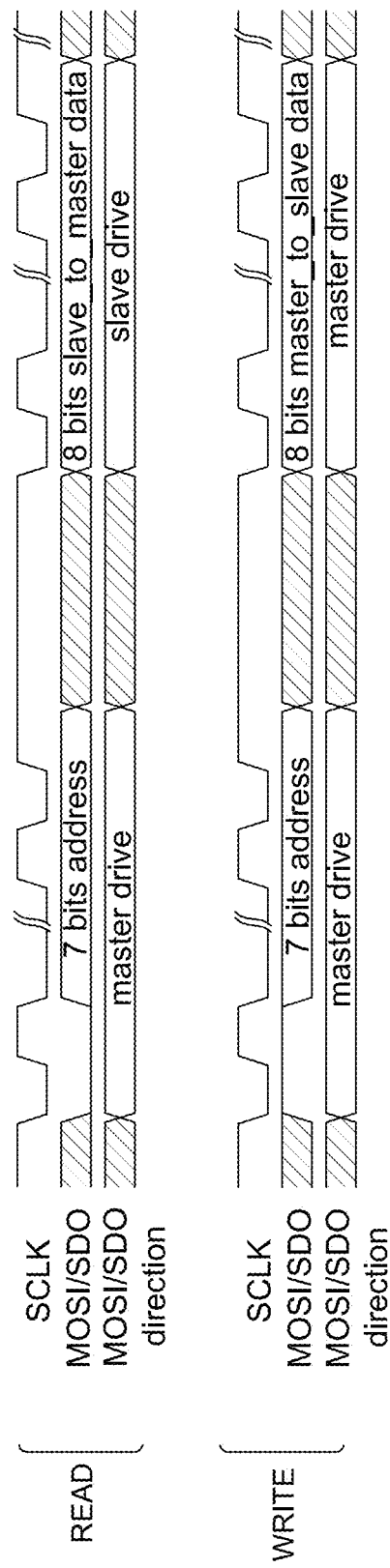
FIG. 2 is an operational schematic diagram of reading/writing operations of a 2-wire interface according to one embodiment of the present disclosure.

Please refer to FIG. 2, it is an operational schematic diagram of a 2-wire interface 100 in a synchronized status (or referred to normal status) according to one embodiment of the present disclosure. In a read operation (shown as READ), the master device 11 transfers 1-bit of read request and 7-bits address to the slave device 13 within 8 clocks of the clock signal SCLK, and reads 8-bits data from a shift register 1351 of the slave device 13 within another 8 clocks of the clock signal SCLK. In a write operation (shown as WRITE), the master device 11 transfers 1-bit of write request and 7-bits address to the slave device 13 within 8 clocks of the clock signal SCLK, and writes 8-bits data to the shift register 1351 within another 8 clocks of the clock signal SCLK.

In FIG. 2, a time difference between the address and the data (e.g., shown by intervals filled with slant lines) is not particularly limited.

In other words, one data transaction includes an address phase within 8 clocks of the clock signal SCLK and a data phase within 8 clocks of the clock signal SCLK. As mentioned above, the read/write operation of the 2-wire interface 100 is determined by an enable signal of the I/O buffers Buf_1 and Buf_2. It is known that the shift register 1351 generally has 8 bits such that each phase includes 8 clocks interval, but not limited to, and thus details thereof are not described herein.

Figure 3:
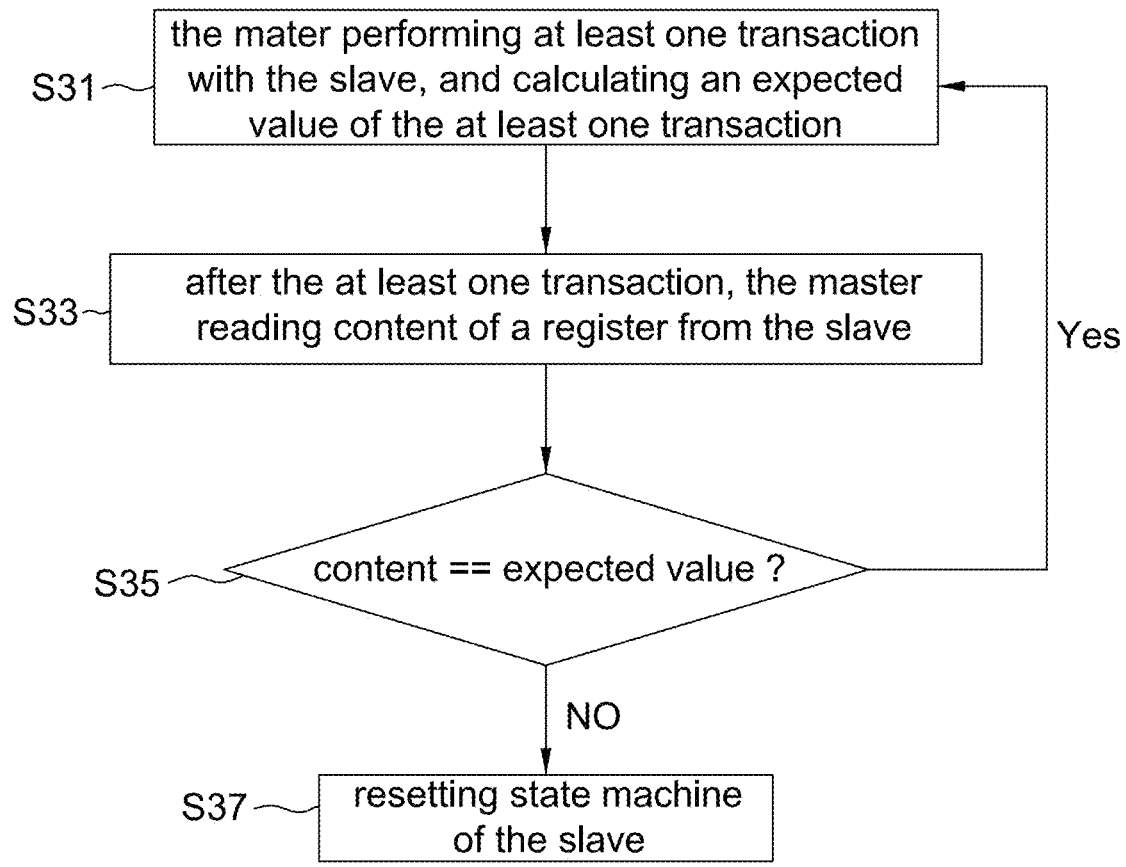
FIG. 3 is a flow chart of a sync detection method of a 2-wire interface according to one embodiment of the present disclosure.
Figure 4:
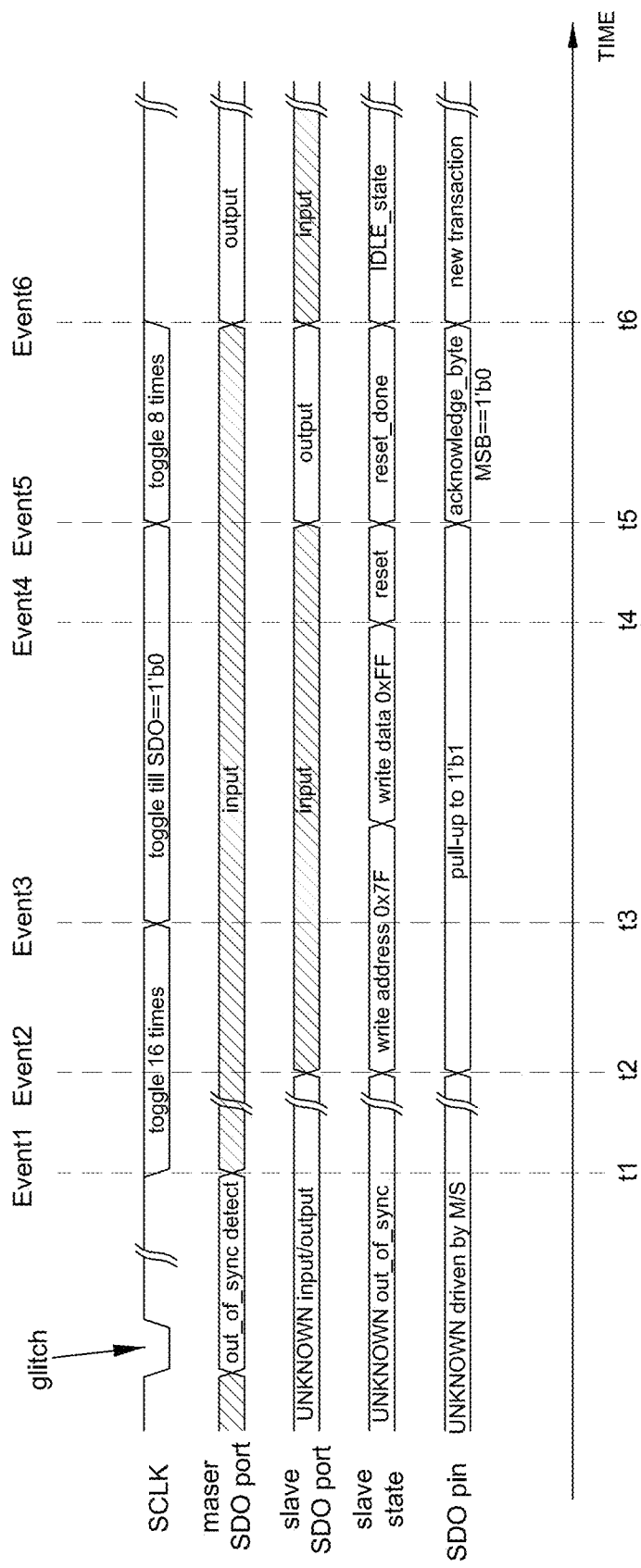
FIG. 4 is an operational schematic diagram of a sync reset method of a 2-wire interface according to one embodiment of the present disclosure.
Figure 5:
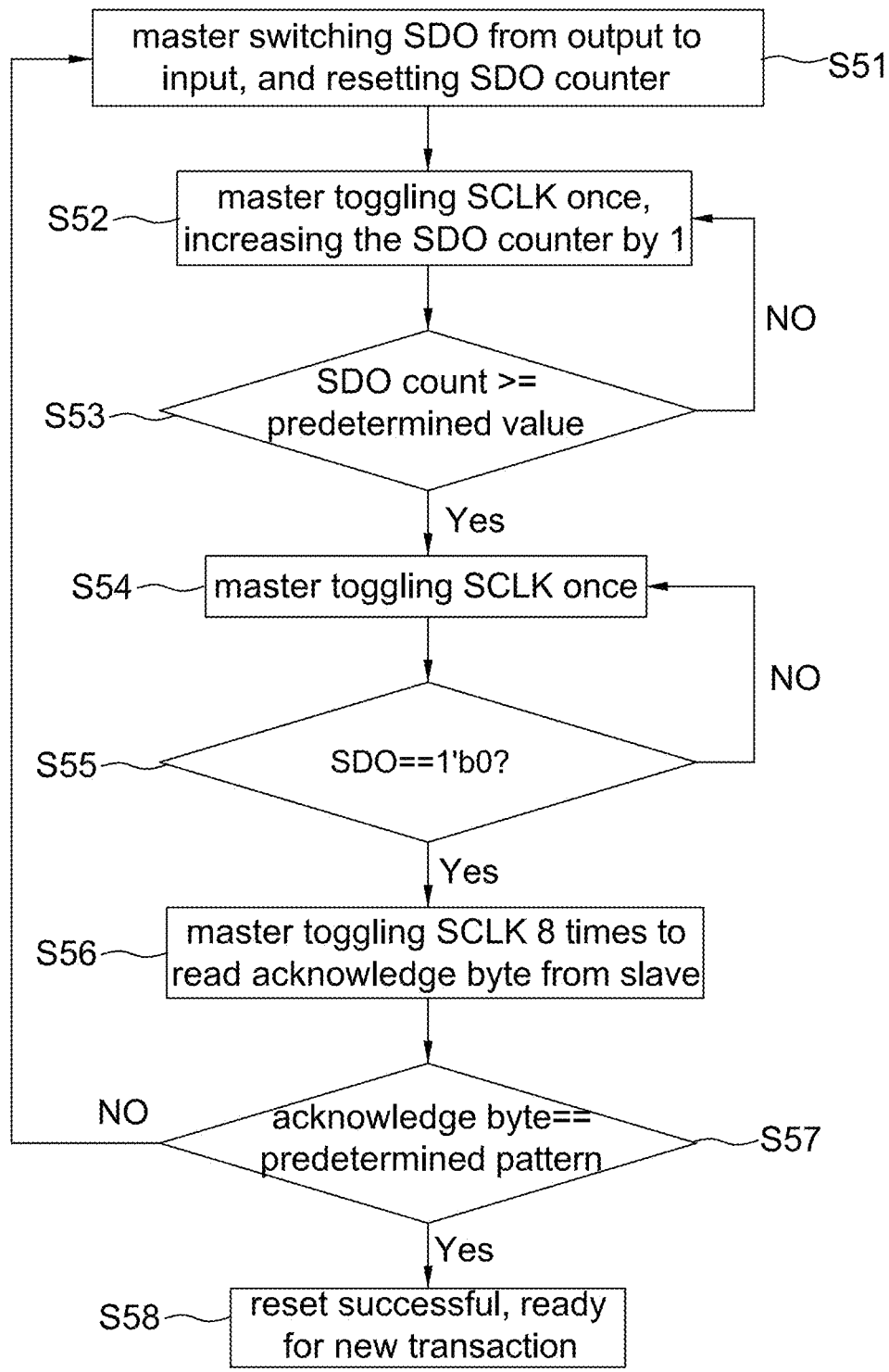
FIG. 5 is a flow chart of a sync reset method of a 2-wire interface according to one embodiment of the present disclosure.

Please refer to FIG. 3; it is a flow chart of a sync detection method of a 2-wire interface 100 according to one embodiment of the present disclosure, including the steps of: performing at least one transaction between a master device 11 and a slave device 13, and calculating an expected value of the at least one transaction (Step S31); reading, by the master device 11, a content value of a register in the slave device 13 after the at least one transaction (Step S33); comparing, by the master device 11, the expected value and the content value to confirm a synchronization between the mater device 11 and the slave device 13 (Step S35); if they are synchronized, returning to the Step S31 to perform a next round of confirmation; whereas, if they are not synchronized, resetting a state machine of the slave device 13 (Step S37), e.g., referring FIGS. 4 to 5.

As mentioned above, one complete transaction includes an address phase of 8 clocks and a data phase of 8 clocks; total 16 clocks of the clock signal SCLK. In one aspect, the register is a transaction check register 1352. The content value in the transaction check register 1352 is updated after each completed transaction. The content value in the transaction check register 1352 is reset to zero after being read (i.e. by the master device 11).

For example, it is assumed that the address and the data of a first transaction is respectively 0x12 and 0x34, the address and the data of a second transaction is respectively 0x56 and 0x78; and the master device 11 reads the transaction check register 1352 at a third transaction in order to obtain a return value (i.e., the content value) from the transaction check register 1352 of the slave device 13.

In one aspect, the master device 11 uses a cyclic redundancy check (CRC-8) algorithm to run across a pattern 0x12345678 (i.e. a combination of 0x12, 0x34, 0x56 and 0x78) to obtain an expected value 0xC7. If the out-of-sync occurs, the return value from the slave device 13 is not equal to 0xC7 such that the sync detection method in FIG. 3 enters the step S37. The CRC algorithm is known to the art, and thus details thereof are not described herein.

In another aspect, the master device 11 uses a checksum algorithm to run across the pattern 0x12345678 (i.e. a combination of 0x12, 0x34, 0x56 and 0x78) to obtain an expected value 0xEC. If the out-of-sync occurs, the return value from the slave device 13 is not equal to 0xEC such that the sync detection method in FIG. 3 enters the step S37. The checksum algorithm is known to the art, and thus details thereof are not described herein.

In a further aspect, the content value in the transaction check register 1352 is a number of times of completed transactions. In this aspect, the content value in the transaction check register 1352 is increased by 1 after each completed transaction. For example, the master device 11 performs N times of transactions with the slave device 13, and the master device 11 reads the transaction check register 1352 at the (N+1)th transaction. Therefore, when the master device 11 reads the transaction check register 1352, a return value from the slave device 13 is supposed to be N (i.e. content value=N). If the out-of-sync occurs, the return value is not equal to N such that the sync detection method in FIG. 3 enters the step S37.

In a further aspect, the register is a product identity register for storing/recording a product identity (i.e. product ID) of the slave device 13. It is assumed that the product identity has, for example, an address 0x1 and a data. 0x75 (i.e. content value=0x75), which is a fixed value. When the master device 11 reads the product identity register, the slave device 13 always returns the content value 0x75 if accurately synchronized. The master device 11 is arranged to read the product identity register automatically or manually. If the out-of-sync occurs, the return value is not equal to 0x75 such that the sync detection method in FIG. 3 enters the step S37.

It should be mentioned that the expected value and the content value herein are not limited to the values mentioned above. The operation after entering the step S37 is referred to a reset method (or referred to sync restoring method) shown in FIGS. 4 and 5.

Please refer to FIGS. 4 and 5, FIG. 4 is an operational schematic diagram of a sync reset method of a 2-wire interface 100 according to one embodiment of the present disclosure; and FIG. 5 is flow chart of a sync reset method of a 2-wire interface 100 according to one embodiment of the present disclosure, wherein FIG. 4 shows that the master device 11 detects an out-of-sync due to a glitch, e.g., using the method shown in FIG. 3 for the detection.

The sync reset method of the 2-wire interface 100 includes the steps of: changing/switching an SDO port of a master device from output to input, and resetting an SDO counter (Step S51); toggling, by the master device, the clock signal SCLK once, and increasing the SDO counter by 1 (Step S52); identifying whether an SDO count is larger than or equal to a predetermined value (Step S53); if not, returning to the Step S52; if yes, entering Step S54 to toggle the clock signal once; in Step S55, identifying whether a voltage on an SDO line is logic 0 (e.g., shown as 1'b0); if no, returning to the Step S54; if yes, entering Step S56 to toggle the clock signal for 8 times by the master device to read an acknowledge byte from the slave device (Step S56); identifying, by the master device, whether the acknowledge byte is identical to a predetermined pattern; if not, returning to the Step S51 to restart the reset process; if yes, the reset is successful and a new transaction is ready to be performed (Step S58).

Please refer to FIG. 1 and FIGS. 4-5 details of the reset method of this embodiment are illustrated hereinafter.

Step S51: When the master device 11 identifies an out-of-sync occurs at a first time t1 (shown as Event1), the SDO port 113 thereof changes from output to input, e.g., MOSI enable signal disabling the I/O buffer Buf_1, Meanwhile, the master device 11 resets the SDO counter 115 to 0.

Steps S52-S53: The master device 11 starts toggling the clock signal SCLK to the slave device 13 from the first time U. Meanwhile, the master device 11 uses the SDO counter 115 to count clocks of the clock signal SCLK behind the first time t1 to a predetermined value. When the out-of-sync appears, the master device 11 does not know at which clock of the clock signal SCLK the out-of-sync appears among a current transaction; or at which intermediate state the slave device's state machine may be in when the out-of-sync appears among a current transaction. In order to make sure that the clock signal SCLK is toggled across an end of the current transaction (e.g., shown by Event2 at a second time t2) till the reset is done (e.g., shown by Event5 at a fifth time t5) to the slave device 13, preferably the predetermined value is selected to cause an Event3 (i.e. SDO counter 115 counting to the predetermined value) to occur between the second time t2 and the fifth time 15. However, because different slave devices require different time intervals to perform reset (e.g., an interval between t4 and t5) order to be able to adapt to different slave devices, more preferably the predetermined value is arranged between a range of 16 and 31 (e.g., shown as 16 in FIG. 4) such that the Event3 is always between the second time t2 and a fourth time t4 (shown as Event4) at which the reset is invoked.

When the slave device 13 accomplishes the current transaction at the second time t2 (i.e. Event2), the SDO port 133 thereof changes to input (e.g., the MISO enable signal disabling the I/O buffer Buf_2) at the second time t2 to cause a voltage on the SDO line 17 to be pulled up to logic high, e.g., pulled up by a resistor R1 and a voltage source VDDIO. Meanwhile, because the maser device 11 continuously toggles the clock signal SCLK to the slave device 13, and the voltage on the SDO line 17 is at logic 1, it means that the address 0x7F of the slave device 13 is written by write data 0xFF within 16 clocks (i.e. one transaction) of the clock signal SCLK behind the second time t2 (e.g., show as t241). Then, the slave device 13 invokes a reset after 16 clocks of the clock signal SCLK behind the second time t2, in response to detecting that a data of 0xFF is written into slave device register 0x7F, i.e. at the fourth time t4.

Steps S54-S55: At the time that the SDO counter 115 counts to the predetermined value, the process of writing 0xFF to the address 0x7F is not finished yet. Therefore, the master device 11 continuously toggles the clock signal SCLK to the slave device 13 till the voltage on the SDO line 17 drops to logic low (e.g., shown by 1'b0).

When the predetermined value is reached, the SDO counter 115 needs not to continuously count the clock signal SCLK in the current reset process.

Step S56: At the fifth time t5, the voltage on the SDO line 17 changes to 1'b0 and the slave device 13 enters a reset_done state. In the reset_done state, the master device 11 toggles the clock signal SCLK successively for 8 times (e.g., show as t5-t6) to allow the slave device 13 to transfer an acknowledge byte to the master device 11. That is, the SDO port 133 of the slave device 13 changes to output, MISO enable signal enabling the I/O buffer Buf_2. The acknowledge byte is any byte known by both the master device 11 and the slave device 13 (e.g., 0x55, but not limited to) without particular limitations as long as the first bit of the acknowledge byte driven on the SDO line during the rose done state is logic zero. For example, a slave device 13 that drives a most significant bit (MSB) of the acknowledge byte on the SDO line at the first SCLK cycle during the reset_done state, —the MSB of the acknowledge byte thereof is logic 0.

In alternative embodiments, if a slave device 13 can be configured to drive a least significant bit (LSB) of the acknowledge byte on the SDO line at the first SCLK cycle during the reset_done state, then the LSB of the acknowledge byte thereof is logic 0.

Step S7: After receiving the acknowledge byte, the master device 11 compares a pre-stored predetermined pattern (e.g., expected acknowledge byte) with the acknowledge byte. If a comparison result indicates a mismatch (different from each other), it means that the reset is not successful and the Step S51 is returned to restart the reset process of this embodiment. In some embodiments, the reset process may be repeated using a different (e.g., lower SCLK clock frequency.

Step S58: If the comparison result indicates a match (identical to each other), the slave device 13 enters an IDLE_state at the sixth time t6 (shown as Event6), and the SDO port 133 thereof changes to input. Meanwhile, the SDO port 113 of the master device 11 changes to output to be ready for a next transaction, e.g., as shown in FIG. 2.

As mentioned above, in the present disclosure, the master device 11 continuously toggles the clock signal SCLK to the slave device 13 till a reset_done state is entered and the transmission of an acknowledge byte is over, i.e. till the sixth time t6 shown in FIG. 4.

In other words, in the present disclosure, the master device 11 is used to identify an out-of-sync with the slave device 13, and changes an SDO port 113 thereof from output to input when identifying the out-of-sync and toggles the clock signal SCLK to the slave device 13 respectively within a first interval, a second interval and a third interval till receiving an acknowledge byte therefrom. The slave device 13 is used to change an SDO port 133 thereof to input when a current transaction is accomplished (shown as Event2 in FIG. 4) to pull up a voltage on the SDO line 17 to logic high 1'b1 till the reset is done, and to send the acknowledge byte within the third interval.

In one embodiment, the first interval is an interval from the out-of-sync to a time point selected from a range between 16 clocks and 31 clocks of the clock signal SCLK, e.g., shown as t1-t3, Within the first interval, the master device 11 uses the SDO counter 115 to count clocks of the clock signal SCLK.

In alternative embodiments, the first interval is an interval from the out-of-sync to a time point selected from a range of 32 clocks and above of the clock signal SCLK, if a number of bits in the address frame or a number of bits in the data frame of a read/write transaction is more than 8-bits.

In alternative embodiments, the first interval is an interval from the out-of-sync to a time point selected from a range of 32 clocks and above of the clock signal SCLK, if a number of data frames in a read/write transaction is more than 1 (e.g., a burst read or a burst write transaction with a single address frame and multiple back to back data frames).

The second interval is an interval behind the first interval till the voltage on the SDO line 17 is pulled down to logic low VW (due to the SDO port 133 changes to output, and the slave device 13 driving out the MSB of the acknowledge byte on SDO port 133), e.g., shown as t3-t5. In the second interval, the SDO counter 115 does not count the clock signal SCLK.

In one embodiment, the third interval is an interval within 8 clocks of the clock signal SCLK during which the slave device 13 is in a reset_done state, e.g., shown as t5-t6.

In alternative embodiments, the third interval is an interval with more than 8 clocks of the clock signal SCLK during which the slave device 13 is in a reset_done state, if a number of bits in the acknowledge byte is extended beyond 8-bits.

In one aspect, the first interval, the second interval and the third interval are successive/continuous time intervals as shown in FIG. 4.

In the embodiments of the present disclosure, the master device 11 includes a first processor, e.g., micro controller unit (MCU), to perform the operations of the master device 11 using hardware, software and/or firmware, e.g., the logic core and the buffer circuit thereof being included in the first processor. The slave device includes a second processor, e.g., digital signal processor (DSP) or an application specific integrated circuit (ASIC) to perform the operations of the slave device 13 using hardware, software and/or firmware, e.g., the logic core and the buffer circuit thereof being included in the second processor.

It should be mentioned that all values, such as a number of clocks of SCLK, address code and bits thereof, data code and bits thereof, a count value, an expected value, a number of transactions and a return value in the present disclosure are only intended to illustrate but not to limit the present disclosure.

As mentioned above, the conventional 2-wire SPI although can use the hard reset or adopt multiple data transactions or an additional watchdog timer to recover from the out-of-sync condition, these method have the issues of limited operating speed or high power consumption. Accordingly, the present disclosure further provides a sync detection method of a 2-wire interface (e.g., FIG. 3), a reset method of a 2-wire interface (e.g., FIGS. 4-5) as well as a 2-wire interface using the same (e.g., FIG. 1) that pull up a voltage on an SDO line to logic high after an out-of-sync is detected and a current transaction is over, and use the master device to continuously toggle SCLK to the slave device till the slave device enters a reset_done state. The 2-wire interface of the present disclosure has the advantages of without increasing the power consumption and without limiting the operating speed of the interface.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A reset method of a 2-wire interface, the 2-wire interface comprising a master device and a slave device coupled by a clock line and a serial data out (SDO) line, the reset method comprising:

changing an SDO port of the master device from output to input when the master device identifies an out-ofsync occurring at a first time, and resetting an SDO counter of the master device;

changing an SDO port of the slave device to input when the slave device accomplishes a current transaction at a second time to pull up a voltage on the SDO line to logic high;

invoking reset of the slave device after toggling 16 clocks behind the second time and transferring an acknowledge byte to the master device in a reset_done state of the slave device; and identifying, by the master device, whether the acknowledge byte is correct, wherein the master device continuously toggles clocks to the slave device after the first time till the acknowledge byte is over.

2. The reset method as claimed in claim 1, further comprising:

counting, by the SDO counter, the clocks after the first time to a predetermined value, which is behind the second time and prior to the invoking reset.

3. The reset method as claimed in claim 2, wherein the predetermined value is between 16 and 31.

4. The reset method as claimed in claim 2, wherein after the predetermined value, the master device continuously toggles the clocks to the slave device till the voltage on the SDO line drops to logic low.

5. The reset method as claimed in claim 1, wherein within the reset_done state, the master device toggles the clocks for 8 times, and
the SDO port of the slave device changes to output.

6. The reset method as claimed in claim 1, wherein within an interval of the 16 clocks behind the second time, a write address 0x7F of the slave device is written by write data 0xFF.

7. The reset method as claimed in claim 1, wherein a most significant bit of the acknowledge byte is logic 0 or a least significant bit of the acknowledge byte is logic 0.

8. The reset method as claimed in claim 1, further comprising:

entering an idle state after the slave device sending the acknowledge byte.

9. A 2-wire interface, comprising:

a master device, comprising an SDO counter configured to count clocks of a clock signal; and a slave device, configured to perform transactions with the master device via a clock line, which is configured to transfer the clock signal, and an SDO line, wherein the master device is configured to identify an out-of-sync with the slave device, and change an SDO port thereof from output to input when identifying the out-of-sync and toggle the clocks to the slave device respectively within a first interval, a second interval and a third interval till receiving an acknowledge byte, and the slave device is configured to change an SDO port thereof to input when a current transaction is accomplished to pull up a voltage on the SDO line to logic high till reset is over, and send the acknowledge byte within the third interval.

10. The 2-wire interface as claimed in claim 9, wherein the first interval is an interval from the out-of-sync to a time point selected from a range between 16 clocks and 31 clocks, and the master device is configured to use the SDO counter to count the clocks within the first interval.

11. The 2-wire interface as claimed in claim 9, wherein the second interval is an interval behind the first interval till the voltage on the SDO line is pulled down to logic low.

12. The 2-wire interface as claimed in claim 9, wherein the third interval is an interval within 8 clocks, and within the third interval, the slave device is in a reset-_done state.

13. The 2-wire interface as claimed in claim 12, wherein after the reset_done state, the slave device is configured to enter an idle state,
the SDO port of the master device changes to output, and
the SDO port of the slave device changes to input.

14. The 2-wire interface as claimed in claim 9, wherein a most significant bit of the acknowledge byte is logic 0 or a least significant bit of the acknowledge byte is logic 0.

15. The 2-wire interface as claimed in claim 9, wherein the 2-wire interface is a 2-wire serial peripheral interface.

* * * * *